United States Patent [19]

Collins et al.

[11] Patent Number: 4,834,066
[45] Date of Patent: May 30, 1989

[54] EVACUATED SOLAR COLLECTOR TUBE

[75] Inventors: Richard Collins, Riverstone; Bernard Pailthorpe, Ashfield; Brendan Bourke, Chatswood, all of Australia

[73] Assignees: The University of Sydney; Rheem Australia Ltd., both of Australia

[21] Appl. No.: 124,942
[22] PCT Filed: Dec. 23, 1986
[86] PCT No.: PCT/AU86/00393
§ 371 Date: Aug. 21, 1987
§ 102(e) Date: Aug. 21, 1987
[87] PCT Pub. No.: WO87/03950
PCT Pub. Date: Jul. 2, 1987

[30] Foreign Application Priority Data

Dec. 23, 1985 [AU] Australia ............................ PH4009
Oct. 3, 1986 [AU] Australia ............................ PH8304

[51] Int. Cl.⁴ ................................................ F24J 3/02
[52] U.S. Cl. .................................. 126/443; 126/442; 126/901
[58] Field of Search ............... 126/442, 418, 419, 901, 126/441, 443

[56] References Cited

U.S. PATENT DOCUMENTS

| | | | |
|---|---|---|---|
| 4,142,509 | 3/1979 | Hermann et al. | 126/441 X |
| 4,186,724 | 2/1980 | Nelson | 126/418 X |
| 4,282,857 | 8/1981 | Pei | 126/443 X |

Primary Examiner—Larry Jones
Attorney, Agent, or Firm—Ostrolenk, Faber, Gerb & Soffen

[57] ABSTRACT

A solar energy collector element having an inner tube which carries a heat exchange fluid, an outer glass tube, an evacuated space between the two tubes and a solar selective surface coating in thermal contact with the outer surface of the inner tube. A gas is admitted to the evacuated space for the purpose of degrading the vacuum and limiting the stagnation temperature of the collector element. The gas is selected to exhibit hydrophobic characteristics, to absorb onto the selective surface coating at temperatures less than a predetermined temperature to desorb into the evacuated space at temperatures greater than the predetermined temperature but not adsorb significantly onto the outer glass tube.

11 Claims, 2 Drawing Sheets

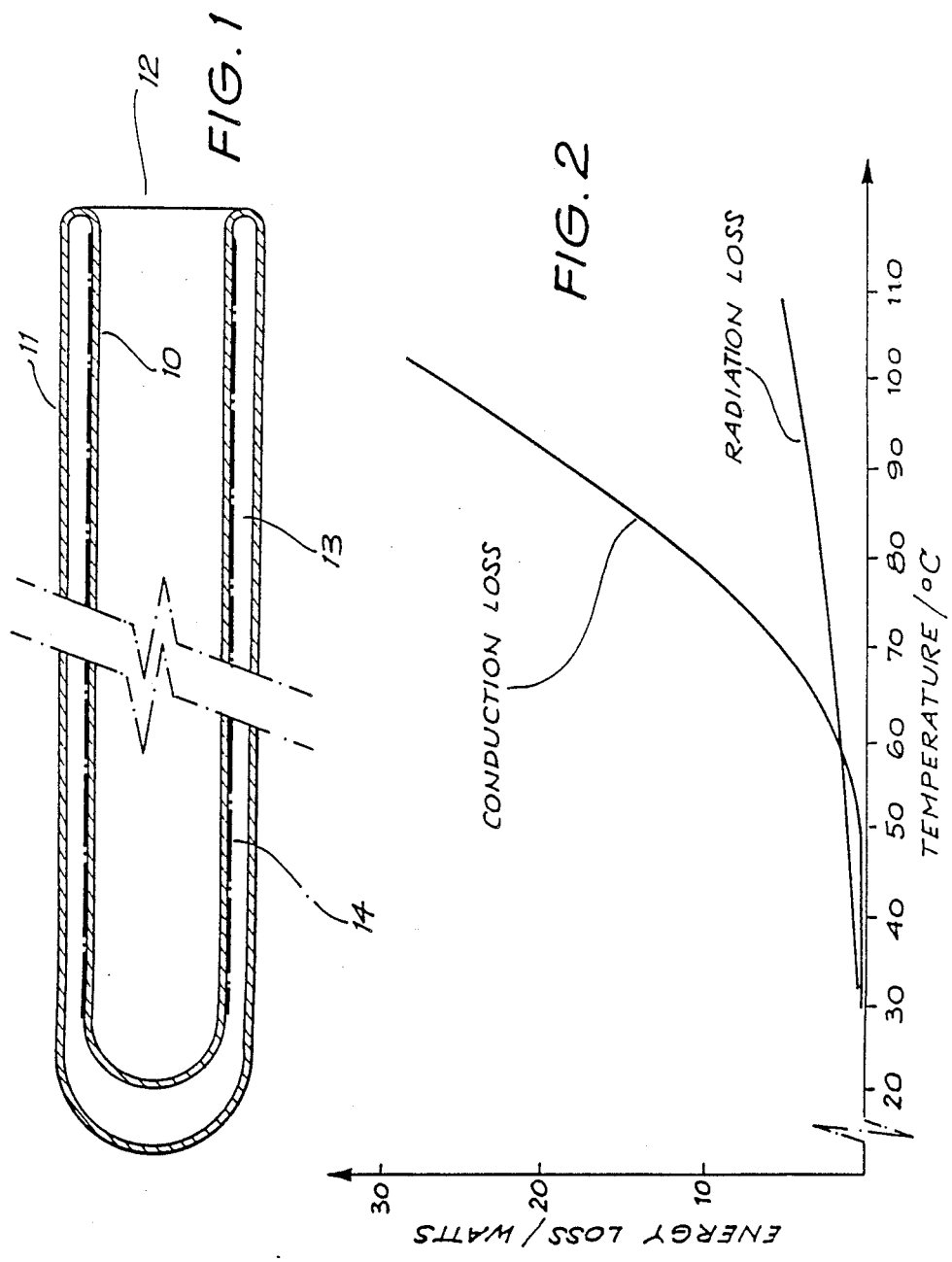

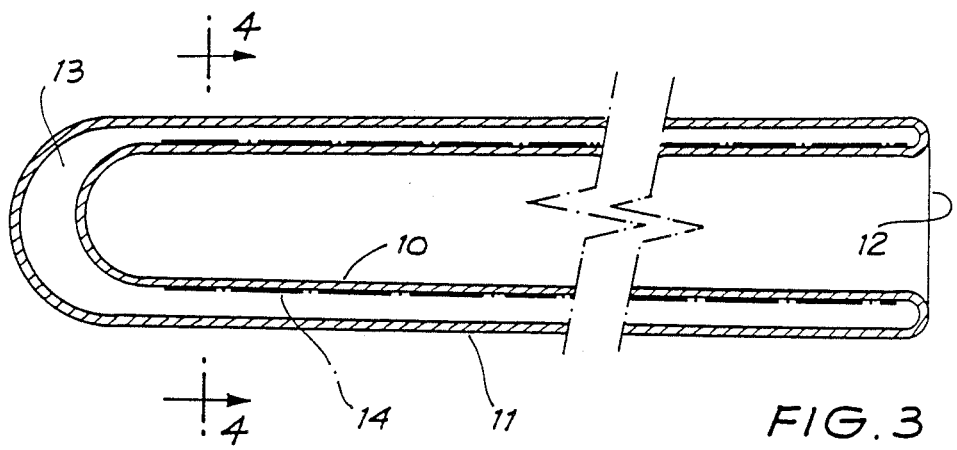
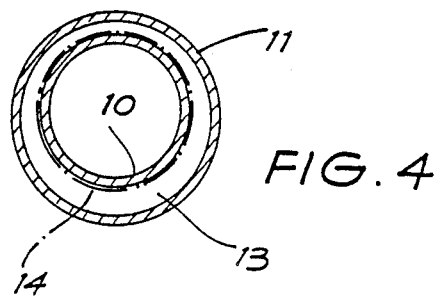
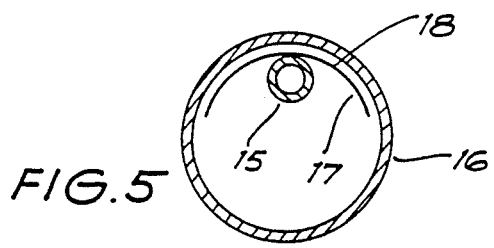
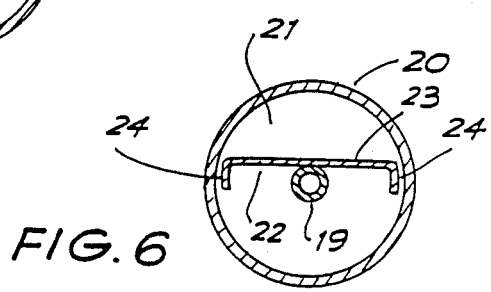

EVACUATED SOLAR COLLECTOR TUBE

This invention relates to an evacuated solar collector tube in which the vacuum is degradable under certain conditions to limit the stagnation temperature of the tube.

Collector tubes conventionally comprise an inner glass or metal tube, through which a heat exchange fluid is passed, and an outer glass tube enveloping at least a portion of the length of the inner tube. The space between the two tubes is evacuated and the outer surface of the inner tube is coated with a solar selective surface coating. The selective surface coating is chosen to provide for high absorption of solar radiation and low emittance of thermal radiation, so that the collection of incident solar radiation is maximised and the quantity of energy lost by infra-red radiation is minimised. A high level vacuum, in the order of $10^{-5}$ Torr surrounding the selective surface coating virtually eliminates heat loss from the surface by conduction and convection processes.

A selective surface coating which has been found to be particularly efficient comprises a base coating of copper and an outer iron-chromium-nickel-carbon cermet. The copper is sputtered onto the tube by a non-reactive process and the metal-carbide coating is deposited by sputtering the metal from a stainless steel electrode onto the tube surface in the presence of a reactive gas such as acetylene. The reactive sputtering process is controlled such that the resultant cermet is graded from a metal-rich coating at the interface with the copper to a carbon-rich coating at the outside.

The combination of an efficient selective surface coating and a high vacuum insulation results in high quality collectors which stagnate (i.e., reach an equilibrium condition where losses equal energy gain) at temperatures as high as 300° C. in non-concentrated sunlight. Thus, the collector elements are particularly useful in thermal systems which are designed to operate at quite high temperatures. The collectors are also very suitable for use in systems which are intended to operate at relatively low temperatures, because the low losses and high collection efficiency permit high energy collection under various conditions, including when relatively heavy cloud cover exists.

However, in some low temperature systems, such as those which are used for producing domestic hot water, tubes which stagnate at very high temperatures (i.e., in the order of 300° C.) can create significant problems. The systems must be designed to prevent the high temperature fluids from entering the system reservoir, where the heat may cause permanent damage to the reservoir lining. Moreover, the high temperature fluid may present a potential safety hazard to users of the system. Therefore, it is desirable under certain circumstances to limit the capability of collector tubes to reach very high temperatures, but any process which is employed to do so should not effect the high performance of the collectors at low temperatures.

One method of achieving high performance at low temperatures and of reducing the stagnation temperature has been suggested in a paper entitled "Thermal Conduction in Evacuated Concentric Tubular Solar Energy Collectors Degraded by Low Pressure Gas" by G. L. Harding and B. Window in Solar Energy Material 4 (1981) 421-434, North-Holland Publishing Company. In page 434 of this paper brief reference has been made to the feasibility of using a gas in the evacuated space of a collector tube to limit the stagnation temperature.

The present invention extends this basic concept by proposing the employment of a gas which exhibits hydrophobic characteristics, which adsorbs onto the selective surface coating at low temperatures (e.g., at temperatures less than about 150° C.) and which desorbs into the otherwise evacuated space at higher temperatures.

Thus, the present invention provides a collector element for use in a solar energy collector system and which comprises an inner (glass or metal) tube into which a heat exchange fluid may be directed, an outer glass tube enveloping at least a portion of the length of the inner tube, an evacuated space between the two tubes, a solar selective coating in thermal contact with the inner tube, and a gas (which may comprise a mixture of two or more gases) which is admitted into the evacuated space for the purpose of limiting the stagnation temperature of the collector element. The gas is admitted to the space between the tubes following evacuation of the space and before removal of the collector element from a vacuum pump. The gas exhibits hydrophobic characteristics and is selected to adsorb onto the selective surface coating at temperatures less than a predetermined temperature, to desorb into the evacuated space at temperatures greater than the predetermined temperature but to not adsorb significantly onto the outer glass tube.

The solar selective coating may be deposited on a plate which is in thermal contact with the inner tube, or it may be deposited directly onto the outer surface of the inner tube.

By appropriately selecting the gas or, possibly, a mixture of two or more gases, the adsorption and desorption of the gas (or gas mixture) onto and from the surface coating may be varied to meet the needs of different systems. For example, in the case of a domestic hot water system it may be decided that the collector tube should stagnate at 80° C., whilst in another system it may be desirable that the tube stagnate at 150° C. With the approach which is taken by the present invention, the high temperature performance of the collector tube may be degraded significantly without affecting the low temperature performance of the tube.

The temperature at which desorption commences and the rate at which desorption proceeds is determined by a number of factors, including the molecular structure of the gas. It is important that the gas should not adsorb to any significant extent onto the relatively cold outer glass tube. This is achieved by use of a hydrophobic gas, by which is meant a gas which exhibits a significantly greater adsorption affinity to the selective surface coating than to the glass from which the outer tube of the collector element is formed. The outer glass tube has an inner surface which presents to the desorbed gas an atomic structure which is similar to that of water, in the sense that it comprises many OH radicals. A gas which exhibits a low interactive energy with the glass may therefore be regarded as hydrophobic. The gas preferably is selected such that the selective surface coating is geometrically accommodating to the gas molecules, in the sense that a packing affinity will exist between the molecules of the gas and the surface coating.

In the case of a metal-carbide surface coating which is composed predominantly of carbon at its outermost surface, it has been found that hydrocarbon gases such as alkanes and aromatics are suitable. These species include the simple alkanes, such as pentane, hexane and heptane, and their isomers, such as isopentane. Suitable aromatics include benzene and its derivatives, for example toluene. Substituted side group or groups may be chosen to permit an increase in the interaction of the gas molecule with the selective surface coating. The isomers and homologues of the abovementioned species may also be suitable.

If it is found that the volume or surface area of the selective surface coating is not sufficient to fully adsorb the gas or gas mixture at low temperatures and the vacuum is unacceptably degraded by free molecules at the low temperatures, then one of two possible approaches may be taken. The volume of gas which is admitted to the evacuated space may be reduced, although this may result still in an unacceptably high stagnation temperature, or an adsorbing agent may be located in the evacuated space. Such agent may comprise, for example, a layer of charcoal cloth or a deposit of carbon which is excessive to the requirements of the selective surface coating. The cloth or carbon deposit may be applied in a localised band to the outer surface of the inner tube, preferably at one end of the evacuated space so as not to significantly reduce the collection efficiency of the selective surface coating.

In most applications of the invention it is desirable that a sharp transition occur between the low temperature, high efficiency and the high temperature, low efficiency operating conditions, and it has been found that this may be achieved by maintaining the solar selective surface coating in close-spaced relationship to the outer tube. However, if the size of the outer tube is reduced to such an extent as to achieve the close-spaced relationship over the entire area of the surface coating, it is likely that normal manufacturing tolerances will result in interference between the outer tube and the substrate (i.e. the inner tube or a plate) which carries the surface coating. Therefore, in one embodiment of the invention it is proposed that the selective surface coating be positioned adjacent the outer tube by locating the inner tube eccentrically within the outer tube. Alternatively, the inner tube may be positioned concentrically within the outer tube if the surface coating is deposited on a plate which is shaped to lie adjacent the outer tube over at least a portion of the area of the plate.

The invention will be now fully understood from the following description which is provided with reference to the accompanying drawings:

FIG. 1 shows a side elevation view of a collector element to which the invention has application, FIG. 2 shows a graph of results obtained when adding a hydrophobic gas to the evacuated space within the collector element, FIG. 3 shows a side elevation view of an alternative collector element, FIG. 4 shows a vertical end elevation view of the element which is illustrated in FIG. 3, the view being taken in the direction of section plane 4—4 shown in FIG. 3, and FIGS. 5 to 6 show sectional end elevation views of alternative elements.

As illustrated in FIG. 1, the collector element comprises a single-ended inner tube 10 which normally would be formed from glass but which could equally be formed from metal if a different type of construction were to be employed. An outer glass tube 11 envelopes the inner tube and is sealed to the inner tube adjacent its open end. An evacuated space 13 exists between the two tubes and the outer surface of the inner tube 10 is coated along a major portion of its length with a solar selective surface coating 14. The coating may take various forms but it preferably comprises a copper base layer and a metal-carbide cermet outer layer as hereinbefore described.

In manufacture of the collector element, the selective surface coating is first deposited on the inner tube 10 and the inner tube is then assembled (joined) to the outer tube 11 using conventional glass fabrication techniques. Thereafter, the collector element is connected to a vacuum pump and the complete element is subjected to a high temperature bakeout whilst the space 13 between the tubes is being evacuated. The space would normally be evacuated to a pressure in the order of $10^{-5}$ Torr. The purpose of this bakeout is to remove gas from the selective surface coating 14, from the glass and from any other components such as tube spacers (not shown) which are located within the space 13.

The above described manufacturing technique is applicable to prior art collector elements as well as that of the present invention, and the bakeout process is effected in order to remove gas which would give rise to (uncontrolled) permanent degradation of the vacuum. In prior art manufacturing techniques, the collector element is permanently sealed after the bakeout and before removal of the element from the vacuum pump.

However, in the manufacture of the collector element of the present invention a small quantity of gas such as benzene is admitted to the space 13 between the tubes immediately following bakeout but before sealing. Benzene, like other hydrophobic hydrocarbon materials adsorbs onto the solar selective surface coating at relatively low temperatures (i.e., below 100° C.) but desorbs into the space 13 to degrade the vacuum at elevated temperatures without adsorbing onto the outer glass tube to any significant extent. The volume of benzene which is admitted to the evacuated space 12 will be dependant on the volume of the space itself, on the effective surface area of the surface coating and on the degree of vacuum degradation required. However, the gas would normally be admitted in an amount sufficient to reduce the vacuum level to a pressure in the order of $10^0$ to $10^{-3}$ Torr when the temperature of the solar selective surface coating is sufficiently high that most of the gas is desorbed.

In operation of the collector element, when the selective surface coating is at a low temperature, the benzene is adsorbed onto the selective surface coating and very little would exist in a gaseous state. Thus, the vacuum within the space 13 will exist at a high level and heat losses from the selective surface to the surroundings will be very low. Therefore, the performance of the tube will be similar to that of a conventional evacuated tube.

However, as the temperature of the selective surface coating increases, a proportion of the adsorbed gas will be desorbed from the surface coating, without adsorbing onto the relatively cold outer glass tube to any significant extent and will result in degradation of the vacuum. At sufficiently high pressures (greater than $10^{-3}$ Torr) thermal conduction through the partial vacuum will give rise to a significant heat loss process for the collector. Such heat loss will limit the maximum temperature which the selective surface coating can reach under stagnation conditions.

Then, when the temperature of the selective surface coating decreases, either due to the absence of incident solar energy or because heat is extracted from the collector element, the gas will re-adsorb onto the selective surface coating and the level of vacuum in the tube will increase. Thus, the performance of the tube will return to its original high level.

The graph of FIG. 2 shows curves of heat conduction loss and radiation loss against temperature for a collector element of the type shown in FIG. 1. The radiation loss increases at an insignificant rate with increasing temperature and such loss is contained as a function of the composition and structure of the selective surface coating. However, it can be seen that the conduction loss increases significantly with increasing temperature above approximately 60° C. and this results from desorption of the benzene gas and degradation of the vacuum.

It normally would be desirable that the stagnation temperature reduce sharply when the operating temperature increases above a predetermined level of, say, 80° C. and this may be achieved by constructing the collector elements with a small space between the tubes or in one or other of the ways shown in FIGS. 3 to 6. However, before referring specifically to these figures it should be explained that heat transport in gases at low pressures is characterised by two distinct domains. At very low pressures, the average distance moved by a gas molecule between collisions with other molecules is considerably greater than the dimensions of the container enclosing the gas. Most of the collisions made by molecules therefore occur with the container walls. In an evacuated solar collector tube operating at a very low pressure, gas molecules transport heat from the hotter selective surface to the colder outer glass tube and undergo a negligible number of collisions with other gas molecules on the way. Under these conditions it can be shown that the rate of heat transport per unit area between the two surfaces H is proportional to pressure p:

$$H = Kp(Ti - To)$$

where Ti and To are the temperatures of the inner and outer surfaces respectively. In addition, it can be shown that the rate of heat transport between the surfaces is only weakly dependent on the geometry of the system and, in particular, is not strongly affected by the average distance between the surfaces.

At relatively high pressures, the mean free path of gas molecules for molecule-molecule collision is quite small compared with distance between the surfaces. Under these conditions, it can be shown that the rate of heat transport between the surfaces is essentially independent of pressure. The heat transport in a tube operating under these conditions can be characterised by a conventional thermal conductivity, $\kappa$, of the gas, and written as $$H = \kappa \frac{A}{l} \Delta T, \text{ or}$$

$$H = \frac{2\kappa L}{\ln(r2/r1)} \Delta T$$

for plane parallel, and cylindrical geometry respectively. In these expressions, A is the area of the surfaces, and l the distance between them, for plane parallel geometry; r2 and r1 are the radii of the outer and inner cylinders, and L is the length of the cylinders, for cylindrical geometry. $\Delta T$ is the temperature difference between the surfaces.

As above mentioned, in an evacuated solar collector tube which is required to stagnate at a low temperature, it is highly desirable that the transition from the high vacuum, negligible loss case to the poor vacuum, large conduction loss case occurs over as narrow a temperature range as possible. A first requirement which must be met if this is to be achieved is that the gas pressure in the tube must increase rapidly as the temperature increases. The gas pressure in the tube is determined (among other things) by the rates at which gas molecules desorb from, and resorb on the selective surface coating. As a generalisation, the probability per unit time of desorption of a molecule from a surface can be written:

$$Ye = Yeo \, e^{-Eo/kT}$$

where Eo is an energy characteristic of the molecule and the surface, and is referred to as the activation energy for the adsorption/desorption process, and Yeo is a constant.

If this probability of desorption increases rapidly with temperature it can be shown that the gas pressure will also exhibit a similar strong temperature dependence, at least in the low pressure domain. In order to achieve a rapid increase of pressure with temperature, it is therefore necessary to choose a molecule and a surface with as high an activation energy, Eo, as possible.

The dependence of pressure on temperature is directly reflected in the temperature dependence of heat losses from the tube at low pressures. As the pressure increases, however, a point is reached at which the mean-free-path for molcule-molecule collisions is comparable with the distance between the hot selective surface and the colder outer wall of the tube. At higher temperatures, further increases in gas pressure are not accompanied by more rapid heat transfer and as previously mentioned, heat losses in this domain are virtually independent of pressure.

In order to increase the sharpness of the transition from efficient to inefficient collector operation, it is highly desirable for the evacuated tube to operate in the low pressure domain since the rapid variations in pressure with temperature are reflected in rapid changes in heat loss. The range of pressures (and temperatures) over which the tube operates in this domain can be increased by increasing the pressure at which the mean-free-path for molecule-molecule collisions becomes comparable with the container dimensions. This can be achieved by reducing the distance between the selective surface and the glass wall of the vacuum vessel.

A decreased distance between selective surface and outer glass tube has no significant effect on the heat losses at low pressures. Heat losses are effectively independent of container dimensions in this pressure range. It can also be shown that the gas pressure is not strongly affected by container dimensions in this range, at least in the situation when most of the gas molecules in the system are adsorbed on the selective surface (as occurs here). However, a decreased surface-to-glass distance permits the temprature range to be increased over which the pressure (and therefore the heat losses) increase rapidly with temperature. This has the overall effect of decreasing the range of temperatures between the point at which significant heat losses commence and the point at which all the energy absorbed by the tube is transferred by thermal conduction through the gas.

Thus, the transition from negligible thermal losses to maximum thermal losses can be made to occur over a smaller range of temperatures if the gap between inner and outer tubes is reduced. Reducing the gap has no significant effect on the heat losses at low pressures. A tube with a smaller gap, however, exhibits a greater thermal conductance in the high pressure region and therefore dissipates energy under stagnation conditions more effectively than a tube with a larger gap. A key factor relating to the sharpness of the transition in operating characteristics in the tubes is thus the gap between the selective surface and the outer glass envelope.

In a conventional type of evacuated collector tube, such as shown in FIG. 1 of the drawings, the minimum size of gap between inner and outer tubes is determined by dimensional variations of the glass tubes. These tubes can vary in diameter, wall thickness and straightness due to fluctuations in the drawing process. In order to reduce the gap as required by the present invention, it might be possible to specify tube tolerances more closely than is conventionally done. Alternatively, a comparative sizing operation might be effected in order to match inner and outer tubes. Finally a straightening operation might be formed on either or both tubes.

However, a significant reduction in the effective gap between the inner and outer tubes may be achieved by mounting tubes in a non-concentric manner, a shown in FIGS. 3 and 4 of the accompanying drawings.

The collector element comprises a single-ended inner tube 10 which would normally be formed from glass but which could equally be formed from metal if a different type of construction were to be employed. An outer glass tube 11 envelopes the inner tube and is sealed to the inner tube adjacent its open end 12. An evacuated space 13 exists between the two tubes and the outer surface of the inner tube 10 is coated along a major portion of its length with a solar selective surface coating 14.

The significant factor to be noted in relation to the illustrated collector element is that the inner tube is located eccentrically with respect to the outer tube, so that a portion of the selective surface coating is located closer to the outer tube than it would be if the two tubes were disposed concentrically with respect to one another. Since the thermal conductance at any point of the tube is approximately inversely proportional to the radial gap between the two tubes, the reduction in heat flow at points where the gap is increased is more than balanced by the increase at points where the gap is decreased.

FIGS. 5 and 6 of the accompanying drawings illustrate alternative methods of implementing the present invention. FIG. 5 shows an end elevation view of a collector element which has a small-diameter inner tube or conduit 15 located eccentrically within a relatively large outer glass tube 16, the space within the outer tube and surrounding the inner tube being evacuated. An arcuately shaped substrate 17 is welded or otherwise secured to the inner tube 15 and the substrate carries on its outer surface a solar selective surface coating 18. The substrate 17 extends arcuately within the outer tube 16 and it extends longitudinally for a substantial portion of the length of the outer tube.

The design shown in FIG. 5 provides a very small gap for heat transport between the inner and outer tubes or, more particularly, between the selective surface coating 18 and the outer tube 16 for heat transport. It also has the advantage that, a substantially greater area of selective surface is presented to absorption of solar radiation than would be if the inner tube 15 alone were to be coated on its outer surface with the selective surface coating.

The collector element shown in FIG. 6 also comprises a construction which has an inner tube 19 through which heat exchange fluid may be directed and a significantly larger outer tube 20 which defines an evacuated space 21 surrounding the inner tube. However, in contrast with the two previously described embodiments, the collector element which is shown in FIG. 6 has the inner tube 19 located concentrically within the outer tube. Then, in order to get close proximity between the solar selective surface coating 23, which is carried by a substrate 22, the substrate is arranged to extend diametrically across the outer tube and, by way of circumferentially extending legs 24, to lie closely adjacent the outer tube.

In each of the above described embodiments the space between the inner and outer tubes is subjected to a high temperature bakeout whilst the space is being evacuated. Thereafter, a small quantity of a hydrophobic hydrocarbon material such as benzene is admitted to the space between the tubes. The material adsorbs onto the solar selective surface coating at relatively low temperatures and desorbs into the evacuated space to degrade the vacuum at elevated temperatures, as hereinbefore described.

We claim:

1. A collector element for use in a solar energy collector system, said element comprising an inner tube which in use carries a heat exchange fluid, an outer glass tube which envelopes at least a portion of the length of the inner tube, an evacuated space located between and defined by the outer surface of the inner tube and the inner surface of the outer tube, a solar selective surface coating in thermal contact with the outer surface of the inner tube, and a gas which is admitted into the evacuated space for the purpose of limiting the stagnation temperature of the collector element; the solar selective surface coating comprising a metal-carbide cermet on a metal base, the meal-carbide being graded from a metal rich layer at the coating-base interface to a carbon rich layer at its outer surface, the gas being selected to adsorb onto the solar selective surface coating at temperatures less than a predetermined temperature and to desorb into the evacuated space at temperatures greater than the predetermined temperature, and the gas being hydrophobic whereby it exhibits a significantly greater adsorption affinity to the solar selective surface coating than to the inner surface of the outer glass tube.

2. The collector element as claimed in claim 1 wherein the solar selective coating is applied to the outer surface of the inner tube.

3. The collector element as claimed in claim 2 wherein the inner tube is located eccentrically within the outer tube.

4. The collector element as claimed in claim 1 wherein the solar selective coating is carried by a substrate which is bonded to the outer surface of the inner tube.

5. The collector element as claimed in claim 4 wherein the inner tube is located eccentrically within the outer tube and the substrate has an arcuate form in cross-section, whereby the substrate lies parallel and adjacent to the inner surface of the outer tube.

6. The collector element as claimed in claim 4 wherein the substrate extends substantially diametrically across the outer tube and has marginal edges which lie substantially parallel and adjacent to the inner surface of the outer tube.

7. The collector element as claimed in claim 1 wherein the gas comprises an alkane selected from pentane hexane, heptane, their isomers and homologues.

8. The collector element as claimed in claim 1 wherein the gas comprises an aromatic selected from benzene, its derivatives, isomers and homologues.

9. The collector element as claimed in claim 1 wherein the gas is selected to desorb into the evacuated space at a temperature falling within the range 80° C. to 150° C.

10. The collector element as claimed in claim 1 wherein the gas is admitted to the evacuated space in an amount sufficient to reduce the vacuum level to a pressure in the order of $10^0$ to $10^{-3}$ Torr when the temperature of the solar selective surface coating is raised to a level such that most of the gas is desorbed.

11. A collector element for use in a solar energy collector system and which comprises an inner tube which in use carries a heat exchange fluid, an outer glass tube which envelopes at least a portion of the length of the inner tube, an evacuated space located between and defined by the outer surface of the inner tube and the inner surface of the outer tube, a solar selective coating in thermal contact with the outer surface of the inner tube, and a gas which is admitted into the evacuated space for the purpose of limiting the stagnation temperature of the collector element; the gas being hydrophobic and being selected to adsorb onto the selective surface coating at temperatures less than a predetermined temperature, to desorb into the evacuated space at temperatures greater than the predetermined temperature but not adsorb significantly onto the outer glass tube.

* * * * *